United States Patent
Skauli

(10) Patent No.: US 9,521,322 B2
(45) Date of Patent: Dec. 13, 2016

(54) IMAGING UNIT

(71) Applicant: Forsvarets forskningsinstitutt, Kjeller (NO)

(72) Inventor: Torbjørn Skauli, Oslo (NO)

(73) Assignee: Forsvarets forskningsinstitutt, Kjeller (NO)

( * ) Notice: Subject to any disclaimer, the term of this patent is extended or adjusted under 35 U.S.C. 154(b) by 0 days.

(21) Appl. No.: 14/772,907

(22) PCT Filed: Mar. 13, 2014

(86) PCT No.: PCT/EP2014/054980
§ 371 (c)(1),
(2) Date: Sep. 4, 2015

(87) PCT Pub. No.: WO2014/140189
PCT Pub. Date: Sep. 18, 2014

(65) Prior Publication Data
US 2016/0011050 A1    Jan. 14, 2016

(30) Foreign Application Priority Data
Mar. 15, 2013  (NO) .................................. 20130382

(51) Int. Cl.
*H04N 5/232* (2006.01)
*H04N 5/341* (2011.01)
(Continued)

(52) U.S. Cl.
CPC ......... *H04N 5/23238* (2013.01); *G01J 3/0205* (2013.01); *G01J 3/0289* (2013.01);
(Continued)

(58) Field of Classification Search
CPC ...... H04N 9/05; H04N 5/235; H04N 5/23212; H04N 5/23238; H04N 5/355–5/3559; H04N 9/045; G06T 3/4015; G06T 3/4038; G06T 5/007–5/009; G06T 2200/32; G06T 2207/20208; G01J 3/2823; G01J 3/0205; G03B 37/00–37/06
(Continued)

(56) References Cited

U.S. PATENT DOCUMENTS 3,971,065 A    7/1976  Bayer
6,211,906 B1   4/2001  Sun
(Continued)

FOREIGN PATENT DOCUMENTS

WO    WO-9810254 A1    3/1998
WO    WO-0055602 A1    9/2000
(Continued)

OTHER PUBLICATIONS

Haller, Mirjam, "International Search Report," prepared for PCT/EP2014/054980, as mailed Sep. 30, 2014, six pages.
(Continued)

*Primary Examiner* — Lin Ye
*Assistant Examiner* — Chriss Yoder, III
(74) *Attorney, Agent, or Firm* — Winstead PC

(57) ABSTRACT

An imager contains an image sensor with laterally varying spectral response. The imager is scanned over a scene or object to form a spectral image. The spectral responses are repeated at different positions in the field of view so as to reduce the effect of scene nonidealities, such as angle dependence or temporal variation, on the spectral image data. A part of the image sensor may be used for conventional two-dimensional imaging. This part of the image sensor may be used to estimate the scene geometry and scan movement, enabling further improvement in the spectral integrity.

12 Claims, 3 Drawing Sheets

(51) Int. Cl.

| | | |
|---|---|---|
| G06T 3/40 | (2006.01) | |
| G01J 3/51 | (2006.01) | |
| G01J 3/02 | (2006.01) | |
| G01J 3/26 | (2006.01) | |
| G01J 3/28 | (2006.01) | |
| G01J 3/36 | (2006.01) | |
| H04N 9/04 | (2006.01) | |
| H04N 5/378 | (2011.01) | |

(52) U.S. Cl.
CPC ............... *G01J 3/26* (2013.01); *G01J 3/2823* (2013.01); *G01J 3/36* (2013.01); *G01J 3/513* (2013.01); *G06T 3/4015* (2013.01); *G06T 3/4038* (2013.01); *H04N 5/3415* (2013.01); *H04N 5/378* (2013.01); *H04N 9/045* (2013.01); *G01J 2003/2826* (2013.01); *H04N 2209/041* (2013.01)

(58) Field of Classification Search
USPC .. 348/36–39, 218.1; 382/284, 294; 396/322, 335–340
See application file for complete search history.

(56) References Cited

U.S. PATENT DOCUMENTS

| | | | |
|---|---|---|---|
| 6,289,114 | B1 | 9/2001 | Mainguet |
| 9,122,007 | B2* | 9/2015 | Mary ..................... B82Y 20/00 |
| 2011/0122308 | A1 | 5/2011 | Duparre |
| 2014/0211006 | A1* | 7/2014 | Tulet ..................... G01J 3/2803 348/145 |

FOREIGN PATENT DOCUMENTS

| | | |
|---|---|---|
| WO | WO-2007103385 A2 | 9/2007 |
| WO | WO-2011073430 A1 | 6/2011 |
| WO | WO-2012148919 A2 | 11/2012 |

OTHER PUBLICATIONS

Diner, David J., et al., "Multi-Angle Imaging SpectroRadiometer (MISR) Instrument Description and Experiment Overview," IEEE Transactions on Geoscience and Remote Sensing, vol. 36, No. 4, Jul. 1, 1998, pp. 1072-1087.

Skauli, Torbjørn, "An Upper-Bound Metric for Characterizing Spectral and Spatial Coregistration Errors in Spectral Imaging," Optics Express, vol. 20, No. 2, Jan. 16, 2012, pp. 918-933.

Schechner, Yoav Y., et al.; "Multidimensional Fusion by Image Mosaics"; *Image Fusion: Algorithms and Applications*; 2008; pp. 193-221.

Pollefeys, Marc, et al.; "From Images to 3D Models"; Communications of the ACM, vol. 45, No. 7; Jul. 2002; pp. 51-55.

Mika, Aram M.; "Linear-Wedge Spectrometer"; Proc. SPIE vol. 1298, Imaging Spectroscopy of the Terrestrial Environment; Sep. 1, 1990; pp. 127-131.

* cited by examiner

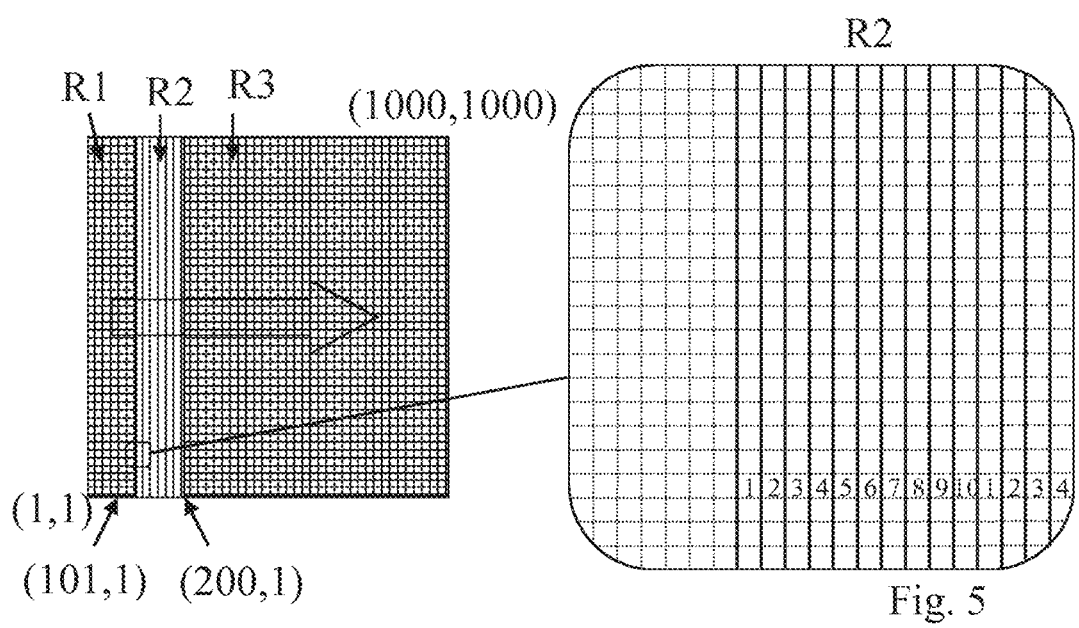

IMAGING UNIT

This invention relates to a spectral image sensor unit for imaging an object having a movement relative to the sensor, and a corresponding system.

BACKGROUND

This invention relates to an imager, or camera, comprising at least one array of photodetector elements, here referred to as an image sensor, as well as imaging optics for projecting an image, such that at least part of the image reveals information about the spectral distribution of incoming light. More specifically, the invention relates to a compact device for multispectral or hyperspectral imaging which may also perform conventional imaging.

Hyperspectral imaging usually refers to imaging techniques which resolve the incoming light into more than 10 spectral bands, often hundreds of bands. Multispectral imaging usually refers to imaging with 2 to 10 bands. In both cases, the bands may be spectrally separate, adjacent or overlapping, although the term hyperspectral is usually understood as implying contiguous spectral bands. Here we will refer to multi- and hyperspectral imaging collectively as spectral imaging.

Although the different spectral components in the signals recorded by the imager are generally referred to as bands, they are more generally characterized by different spectral weightings of the incoming light. This spectral weighting may be effected in many ways, including filtering of the incoming light or adaptation of the different light sensing elements. Depending on the type of spectral imager, the recorded raw data may need to be processed in order to yield a final spectral image product, which we will refer to as the output image.

Spectral imaging records information present in the spectral distribution of incoming light in each image pixel. Most commonly, multispectral imaging is used for colour photography by sampling the light in 3 spectral bands representing the primary colours of the eye. It is well known that spectral information, such as colour in visual imaging, carries important information about objects in an image. The spectrum is generally a fingerprint of the composition of materials present within a pixel area in the imaged scene. For systems involving automated image analysis, the analysis may be facilitated, often to a significant degree, by availability of spectral information.

In many cases 3 spectral bands, such as in ordinary colour imaging, is suboptimal for image processing, and significant new information can be obtained from images with more spectral bands. Even a modest increase to about 6 to 10 spectral bands may provide significant new capabilities in many cases. In other cases it may be desirable to resolve the image spectrally into tens or hundreds of spectral bands. Typically, the technological complexity and cost increases with increasing number of bands. In a spectral imaging device, it is therefore desirable to choose the number of bands close to the minimum acceptable for the foreseen application.

In many practical applications, it is desirable to combine spectral imaging with conventional imaging modalities, such as colour or monochrome imaging where the output is two-dimensional images with limited or no spectral information. An example is the combination of spectral imaging with video for remote sensing target detection and identification. With technologies currently in use, combination of spectral imaging and conventional two-dimensional imaging has required systems containing separate imagers for these functions. This leads to a system with large size and weight, which would be an unacceptable burden on many sensor platforms of interest, such as unmanned aircraft or field portable equipment.

Any design of a spectral imager faces many conflicting requirements. Particular to spectral imaging is the need for spatial coregistration of different spectral bands: In any given pixel in the output image, all bands should sample the same pixel region in the scene, otherwise significant errors result [T. Skauli, Optics Express vol. 20 no. 2, p. 918-933]. Also, it is desirable to sample all spectral bands at the same time and angle, to avoid errors due to temporal or angular dependencies in the scene. Furthermore, since spectral imaging subdivides light into multiple spectral channels, it is desirable for an imager to collect a large amount of light and have a good optical throughput in order to have a good signal to noise ratio. In addition to these specific requirements for spectral imaging, any imager faces important constraints on size and cost.

Many technologies are in use for spectral imaging. Most colour imagers employ a single image sensor with an integrated array of colour filters, for example in a Bayer pattern [B. Bayer, U.S. Pat. No. 3,971,065]. The characteristics of the filter and photodetectors together define a set of different spectral responsivities, in this case adapted to match the different photoreceptors in the human eye. This works well for visual imagery. For imaging with a larger number of bands, however, the filter array concept becomes increasingly difficult to employ because of the large lateral separation of photodetector elements with different filters that contribute to a given pixel in the output image, leading to unacceptable coregistration performance. Also, a large fraction of the light is lost in each filter.

Some colour imagers, and other multispectral imagers, employ one photodetector array for each band, and use beamsplitters to direct one spectral band to each array. However this technology is limited in practice to at most about five spectral bands.

A simple multispectral imager can be built from a monochrome camera with wide spectral responsivity by placing it behind a spinning wheel consisting of multiple spectral filters. However the filter wheel concept suffers from loss of light in the filters as well as moving parts and non-simultaneous sampling of the spectral bands.

By imaging through a Michelson interferometer, it is possible to construct a spectral imager using the principle of Fourier transform spectroscopy. This technology is very favourable for its high optical throughput, but suffers from possible errors due to non-simultaneous sampling of spectral components, as well as large size and complications due to moving parts.

The most widely used technology for hyperspectral imaging is the imaging spectrometer. In this technology, a slit at the focal plane of an objective lens selects light from a region in the scene corresponding to one row of pixels in the output image. By a dispersive element (slit or grating) and reimaging optics, light from each pixel location along the slit is spectrally dispersed onto a column of photodetector elements in a detector array. Then the photodetector signals from one such column correspond to the spectrum of one image pixel. By scanning the field of view in a direction perpendicular to the slit, the sensor can image the two spatial dimensions. This technology offers good spatial and temporal coregistration of different bands, but suffers from low optical throughput due to the slit, as well as a relatively large size.

The most compact technology for hyperspectral imaging uses a bandpass filter in front of a photodetector array in the focal plane, fabricated in such a way that the passband wavelength varies across the image [A. M. Mika, "Linear-wedge spectrometer," Proc. SPIE 1298, 127-131 (1990)]. The combination of filter characteristics and the spectral characteristics of the photodetector array defines a spectral responsivity which varies across the field of view. Typically the filter has a nearly constant spectral variation in one direction, known as a "linear variable filter" (LVF). By scanning the field of view in the direction of spectral variation, and repeatedly reading out the photodetector array, it is possible to assemble a hyperspectral image of an entire scene. Similarly, it is possible to perform multispectral imaging by placing a set of discrete spectral filters in the focal plane in such a way that a scanning motion enables recording of all bands from the entire scene.

This known concept for spectral imaging is illustrated in FIG. 1: A scene or object 1 is imaged by lens 2 onto a photodetector array 3 placed behind an "LVF" filter 4. The scene is scanned relative to the imager in a direction indicated by the arrow 5, leading to a corresponding movement of the image projected onto the photodetector array. For a given point in the scene, different spectral components are recorded at different positions of the scan movement. For this to yield a correct spectral image, the spectral signal from the scene must be independent of viewing angle changes and time during the scanning of any given point within the imaged area.

It can be seen that most of the spectral imaging technologies listed above, and most other technologies for spectral imaging, tend to be large and complex, hence also expensive and difficult to deploy in applications. The notable exceptions are the technologies based on filters in the focal plane. The linear variable filter imager still requires some form of scanning to image a scene. However, means for scanning is often provided in the application anyway, such as for an imager mounted on an airplane or on a pan/tilt actuator.

In U.S. Pat. No. 6,211,906B1, Sun describes a system in which two LVF-based imagers are combined with a conventional imager. This system uses the conventional imager to track the apparent motion of the scene, as seen from the imager. This tracking is used to aid the reconstruction of a hyperspectral image based on data from the two LVF-based imagers.

In International patent application WO2011/073430A1, Biesemans et al. describe an imaging system with two photodetector arrays. One of these arrays is used for conventional recording of two-dimensional frame images, monochrome or colour. The other array is covered by an LVF or by a multiband filter which passes different spectral bands to different regions of the array. The two-dimensional images are used for geometric positioning of the imagery from the filtered photodetector array, enabling the assembly of a spectral image. The authors note that the two-dimensional images may be used to reconstruct three-dimensional shape, as described previously in e.g. in an article by Marc Pollefeys and Luc van Gool "From images to 3D models", pages 51-55, Communications of the ACM, July 202/vol. 45, No. 7.

It can be noted that for the filter-based spectral imaging techniques mentioned above, a precise geometric positioning is needed for each light sample read out from the array, as part of the construction of an output image. Also, this construction of the output spectral image must make the assumption that the scene is constant in time. Furthermore, since filters for different bands are located in different areas of the focal plane, different spectral bands will be viewed in different angles relative to the sensor. This is unproblematic in the case of a rotational scan around the principal point of the imaging optics. However if the scanning has a significant component of linear motion, such as for a sensor on an aircraft or a sensor viewing a conveyor belt, different bands will see the scene from different angles. Then the spectral signal from the scene must also be assumed to be independent of viewing angle. This assumption does not hold in all cases, and significant spectral errors may result for scenes which exhibit parallax effects or non-Lambertian BRDF.

A signal error due to viewing angle dependence may for example arise from parallax effects, as illustrated in FIG. 2. The figure shows an imager in two different positions C1 and C2, for example two points on the movement path of an aircraft, where the distance H is the imager height above ground. The scene has some 3D structure, represented in the figure by a building B with vertical walls and a height h. When the imager is in position C2, it observes a particular point P on the ground in a spectral band whose filter is positioned such that the line of sight is as indicated by the dashed line. This may, for example, be the shortest wavelength of an LVF. When the imager is in position C1, a different band is viewing in the direction of P, for example the longest wavelength of an LVF. However, the line of sight of this latter band is obscured by the roof of the building. Therefore, the amount of light observed in this band represents the roof material and not the ground material. It is thus not possible for the imager to obtain a spectrum from only the ground material at position P when following the path from C1 to C2. If, nonetheless, the recorded data are used to assemble a spectrum, which is then taken to represent position P, the resulting spectrum will have contributions from both the roof and the ground, and their relative contributions will vary between bands. In this case it is clear that large errors in the output image may result from the parallax effects in the scene.

In spectral imaging, it is normal to have some image pixels whose spectrum has contributions from different materials. Indeed, many algorithms for processing spectral images make the assumption that the scene is composed of several different materials which may be present in some mixture within a given image pixel. Crucially, for these algorithms to be applicable, the material mixture must be the same in all bands. If the material mixture differs between bands due to a shortcoming of the imaging process, for example as illustrated in FIG. 2, the spectral signal may be severely distorted. Such distortions are discussed in detail in [Skauli 2012].

If the spectrum from the scene exhibits an angle dependence due to parallax, the effect on the pixel spectrum will typically depend on the spatial resolution, or pixel size in the scene. In the particular case illustrated in FIG. 2, the amount of parallax distortion is expressed by the distance d. A significant error in the assembled spectrum results if this distance is comparable to or larger than the pixel size. Consider the case where the two lines of sight in FIG. 2 are separated by an angle a and represent the two spectral bands that are most widely separated in their viewing angle. Assume, for simplicity, that the imager moves in a straight path parallel to the direction of spectral variation of an LVF in the focal plane. Furthermore, assume that the photodetector array has square pixels so that the element spacing, or pixel pitch, is the same in the direction of movement and in the orthogonal direction. In the focal plane, the angle a corresponds to a distance between the photodetector elements used for recording the two bands. Let this distance be expressed by the number of pixel units between these photodetector elements, denoted S. Thus, S represents the maximum number of different spectral bands that can be recorded by the system. The size of image pixels on the ground is given by $$D=aH/S.$$

The parallax distortion is given by $$d=ah.$$

The parallax distortion can be expressed relative to the pixel size as $$E=d/D=Sh/H$$

Thus for a scene which exhibits angle dependence due to parallax, represented by the example in FIG. 2, the ratio E must be well below 1 to ensure that the recorded spectra are not significantly distorted. Ideally, E should be comparable to, or less than, the relative contribution of noise to the spectral signal.

As an example, consider the highly realistic case of an airborne imager at an altitude H=1000 m and a building height of h=10 m. For an LVF-based spectral imager with S=100 bands, we find E=1. In other words, an LVF-based hyperspectral imager will easily exhibit large distortions in the spectra due to parallax effects, unless the viewing distance is large compared to the height of 3D structure in the scene, multiplied by the number of bands. In the case of a multispectral imager with S=10 bands, we find E=0.1 Even this will tend to result in unacceptable signal distortion, on the order of 10% of the signal. Furthermore, it may be difficult to fabricate an LVF or multiband filter with spectral characteristics that vary in a controlled manner over a very short distance.

Thus it is an object of the present invention to provide a compact solution for scanning three-dimensional object areas while minimizing the distortions due to parallax and other angle dependencies of the scene. The object is obtained with a unit and a system as specified in the accompanying claims.

The invention will be described more in details with reference to the accompanying drawings, illustrating the invention by way of example.

FIG. 5 illustrates the sensor unit according to the invention.

DESCRIPTION OF THE INVENTION

Figure 1:
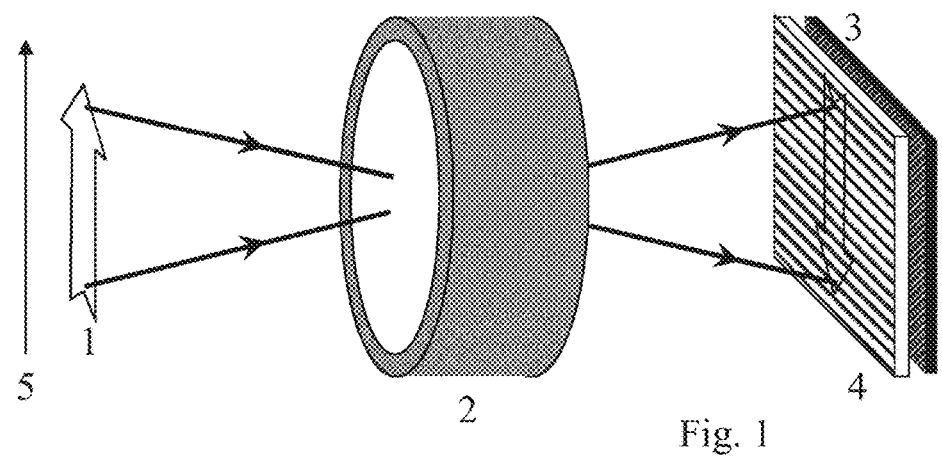
FIG. 1 illustrates a known system for scanning an object.
Figure 2:
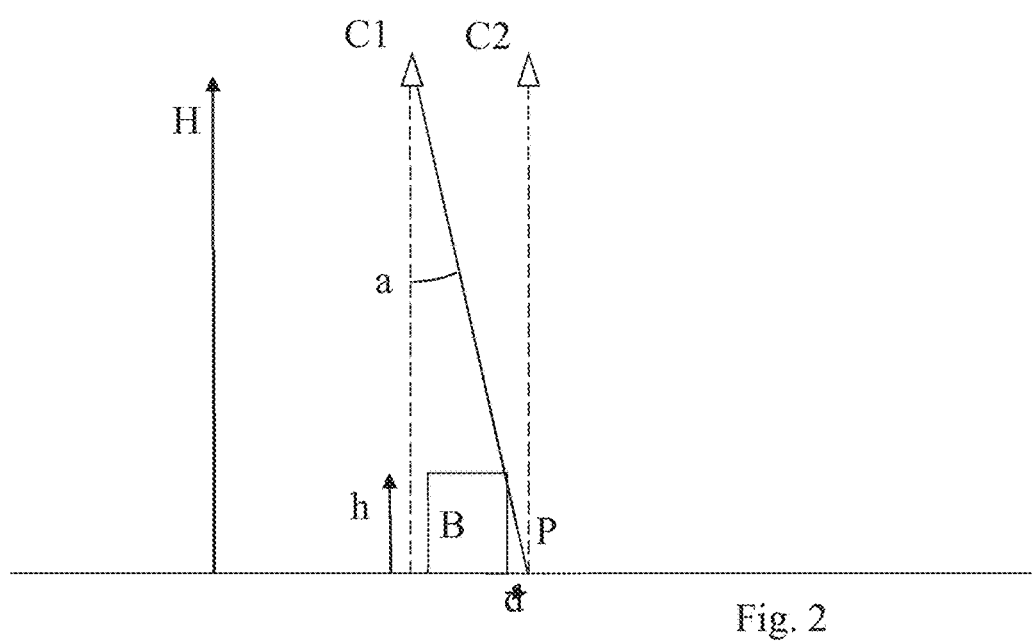
FIG. 2 illustrates the problems related to scanning using a conventional system with corresponding sensor.

As shown by the geometric argument in FIG. 2, it is highly desirable to have a small angular separation between lines of sight for different spectral bands when imaging a scene with parallax effects or other angular dependencies, since otherwise the errors in the spectrum may become large compared to the relative noise level in commonly used imaging systems. Within the limitations of a single continuously varying filter in the focal plane, as illustrated in FIG. 1, it is not possible to achieve the ideal simultaneous sampling of different bands in a given scene point. However, it is possible to arrange the spectral sampling such that each band is sampled at several different angles, for example preferably by repeating the filter pattern periodically over all or part of the photodetector array. By averaging readings obtained at different viewing angles, spectral distortion will tend to be reduced.

Figure 3:
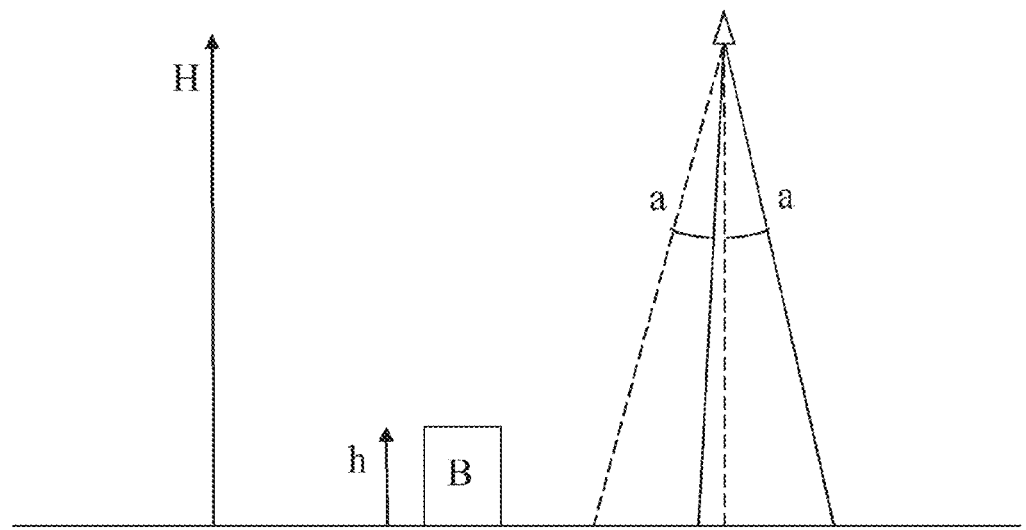
FIG. 3 illustrates the field of view using a sensor according to the invention.
Figure 4:
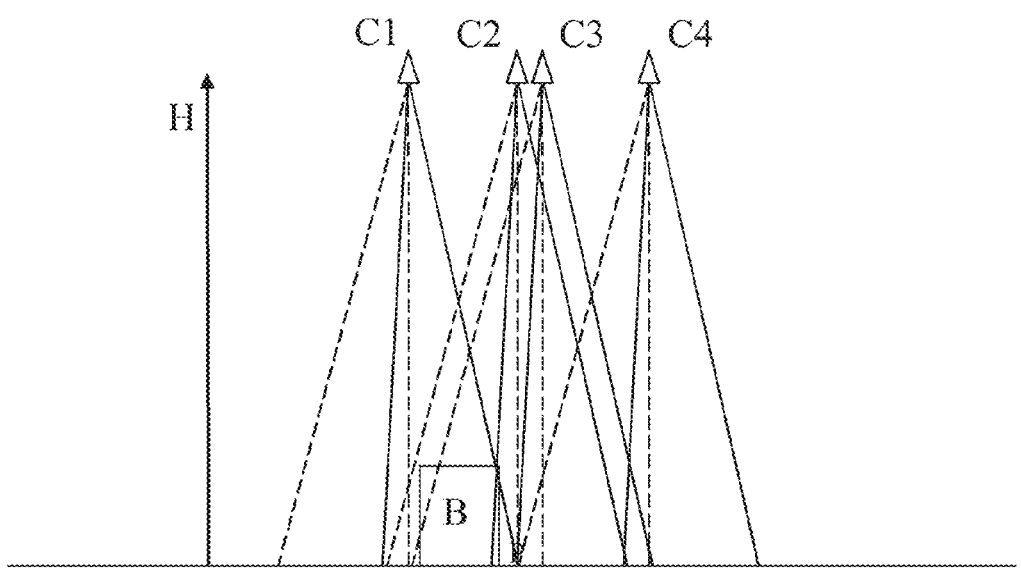
FIG. 4 illustrates a scanning sequence using a sensor according to the invention.

As a simple example, consider the case illustrated in FIG. 3, where the imager from FIG. 2 has been enhanced by repeating the filter pattern twice, indicated by solid and dashed lines representing the bands at the beginning and end of each repetition, each recorded in two different viewing directions. FIG. 4 illustrates the scan motion in this case. For the band whose lines of sight are illustrated by two dashed lines from the imager, the point P is observed unobscured twice, when the imager is in position C2 and C4. For the band whose lines of sight are illustrated by two solid lines, point P is correctly observed from point C3, but obscured by the building at point C1. If these two observations are both taken to represent point P, the signal can be estimated by forming an average of the two readings. An error still results, but comparing to the case in FIG. 2, the error is reduced by a factor 2 in the band illustrated with solid lines. Extending this argument to N repetitions of the filter pattern, the error in the spectrum will tend to be reduced by a factor on the order of N.

The actual improvement will depend on the specific angle dependence of the light from the scene, and may be smaller or larger than the factor N. It is nevertheless clear that repeated sampling will tend to produce a spectrum which is more accurate, in the sense that it is closer to the assumptions of equal mixing proportion of scene materials in all bands. A main aspect of the invention is thus to arrange the spectral filtering pattern such that the different spectral components are sampled multiple times at different viewing angles. Given the strong preference for recording all spectral components within a small angular interval, illustrated by the error estimates above, each repetition should preferably have a small extent on the image sensor.

For illustration, consider that for many spectral imaging applications it is sufficient with 10 bands or less, so that all bands can be recorded over a distance of S=10 pixels in the focal plane. Furthermore consider that repeating the spectral bands about 10 times will result in a very significant reduction of spectral error. Then the full set of repeated spectral bands can be accommodated within a distance of about 100 pixels in the focal plane. Many commonly used image sensors have width and height well in excess of 1000 photodetector elements, significantly more than needed to record the spectral image in the example case here.

As seen from this example, the filter may require only a part of the image sensor, leaving the remaining sensor area available for other use. An important aspect of the invention is that this area may be used for conventional imaging with the same objective lens. This differs from prior uses of LVF for spectral imaging, such as [Sun] or [Biesemans et al.] who have dedicated one image sensor for recording spectral images through an LVF or multispectral filter.

Thus the invention enables a new and potentially very useful class of multifunctional imaging sensor where a single objective lens and a single image sensor, combined with an appropriate filter, can record spectral images by scanning, and at the same time be used for conventional imaging, e.g. video imaging. As noted by [Sun] and [Biesemans et al.], the conventional imagery may, among other purposes, be used to estimate the relative motion of the imager and the scene, as well as to estimate the three-dimensional shape of the scene. This information can then be used for improving the accuracy of the spectral information estimated from the recorded data.

Preferred Embodiment of the Invention

A preferred embodiment of the invention is an imaging system for airborne remote sensing from a small unmanned aircraft. The compact size of the imager according to the invention makes the benefits of spectral imaging available on smaller aircraft, thereby improving access to this technology and also reducing the cost of airborne imaging.

The focal plane of the imager in the preferred embodiment is illustrated in FIG. 5. It uses a silicon CMOS image sensor with 1000×1000 photodetector elements, hereafter referred to as pixels. The pixel pitch is 10 microns in each direction. An objective lens focuses an image of the terrain underneath the aircraft onto the image sensor. The imager is oriented such that the motion of the terrain in the field of view, resulting from the aircraft motion, is predominantly along one axis of the image sensor, here referred to as the scan direction. This direction is indicated by a large arrow in the left part of FIG. 5. The image sensor has three regions R1, R2 and R3. Region R2 contains 100 columns of pixels, starting 100 pixels from the edge of the image sensor. In region R2, separate bandpass filters are deposited on each column of pixels. The filters define 10 spectral bands, in a pattern which is repeated periodically 10 times, as indicated in the right part of FIG. 5 where the arrow defines the image direction of movement over the sensor. The spectral bands are chosen with approximately equal bandwidths spanning the wavelength range from 450 to 900 nm. For spectral imaging, the image sensor is read out with a frame rate such that the scene moves by about half a pixel between readouts. If necessary, windowed readout of a part of the image sensor is used to increase the frame rate. In this case, typically only a part of region R3 is read out, in addition to region R2. The resulting light samples from multiple readouts are used to form a spectral image as outlined below.

The filter is preferably made on a glass plate or similar having a chosen thickness.

Attached to the imaging system is a navigation system. Typically, the navigation system comprises a GPS receiver and an inertial measurement unit, as well as preprocessing software to form an improved estimate of the movement of the system. The navigation system is synchronized with the imager to produce an estimate of the position and attitude of the imager at the time of each image sensor readout.

The navigation data is combined with a geometrical calibration of the system and a terrain elevation model so that each light sample in the recorded image data can be assigned a position in a geographical coordinate system, according to well known procedures for georeferencing of remote sensing imagery. For enhanced accuracy, it is possible to use the imagery recorded in regions R1 and R3 to support the navigation system and/or to refine the terrain model by estimating the three-dimensional structure of the terrain, using well-known methods.

The spectral image output from the system preferably consists of an output pixel grid which is regularly sampled in a rectangular pattern in a geographical coordinate system. For a given band in a given output pixel, the value representing the light level is formed by averaging all light samples from photodetector elements which record signal in this band within the defined output pixel region. The averaging is preferably weighted according to the fraction of the point spread function of each light sample which, when projected in the scene, falls within the defined pixel region. A spectral image is produced by forming such averages for each band in each pixel of the defined output pixel grid.

For some of the pixels in the output image pixel grid, it may not be possible to produce a valid estimate of the spectrum. This may occur near the edges of the field of view, if the output pixel region is not sampled by all bands due to irregular aircraft motion. The system may also determine that a valid spectrum cannot be formed in an output pixel area determined to contain a three-dimensional structure that makes spectral estimates unreliable due to parallax effects. Invalid pixels are flagged in the output image data. Note that by using repeated samples of each band according to the invention, the probability of occurrence for such invalid pixels is significantly reduced compared to imagers where each band is sampled once, such as when employing a conventional LVF.

It will be obvious to those skilled in the art that many other embodiments of the invention are possible. For example, the filter may be a continuously varying bandpass filter similar to an LVF, but having for example a periodic variation of wavelength with position. Also, the different spectral components do not need to be distinct non-overlapping spectral bands: any set of different spectral responses can be used to form an image according to the invention. Furthermore, it is possible to realise the scanning by moving the filter relative to the image sensor, in which case no relative movement between scene and image sensor is needed. It is generally advantageous if the layout of filter and image sensor is such that photodetector elements which record light from a given band are placed along a line, preferably approximately perpendicular to the scan direction. Such placement tends to simplify fabrication, improve the fill factor in the focal plane and ensure that all bands are recorded for any given point in the scene.

According to an alternative embodiment of the invention the filtering part of the sensor, R2, may be adapted to receive a slightly defocussed or softened projection of the imaged area, representing a point scatter function having a size being comparable to the size of the pixels in the reconstructed output image. This may be provided by changing the optical path length to the filtering part, either by positioning the relevant pixels slightly out of the image plane or more practically by changing the thickness of the glass filter over the relevant pixels.

Thus to summarize, the invention relates to a spectral image sensor unit and related imaging system for imaging an object having a movement relative to the sensor. The image of the object is projected along a path over the sensor resulting from said movement. The image of the object may me provided in different ways by using a lens, or opening allowing light from the object to be follow a predetermined path over the sensor. The object may be a single point of the scanned area or a larger image projected over a part of the sensor.

The spectral sensor unit comprises at least two sets of light sensor elements, where each element comprises a filter or other means of adapting the spectral response of the element, the filters possibly being positioned on a glass plate covering the sensors. This way the sensor elements in a sensor set may be provided with a number of filtering means so as to let these sensor elements detect light within a number of wavelengths, as illustrated in FIG. 5 where ten lines of sensor elements are related to different filtering means. As the object passes over the R2 section of the sensor, the object may be scanned with each filter, thus resulting in a multispectral scan of the object. As the sensor unit comprises at least two sets of sensors, the multispectral scan is performed at least twice, thus imaging the object from two fields of view as the scanning is performed.

While FIG. 5 indicate 10 different filters, in general each sensor set will have elements with at least two types of different spectral responses, but for multispectral imaging preferably more than 5, possibly more than 10. To avoid the distortions discussed above, the spectral responses in said at least two sensor sets are essentially identical. Preferably, each filter provides different regions along the path direction with different spectral responsivities in such a way that the spectral responsivity is uniform, or substantially uniform, within each region, each region being related to at least one sensor element in the corresponding sensor set. This way the spectral range of the filters may change in a stepwise manner along the path, the steps covering one or more sensor elements along the path direction.

Alternatively the spectral response of each filter may provide a continuous variation across at least part of each filter set along the path direction, the corresponding sensor elements receiving light within a spectral range determined by the position along the varying spectral response.

The scanning is provided by movement of the image sensor relative to the scene or object or possibly by only moving the filter and scanning the object with sensor elements having a fixed position relative to the object.

The sensor sections as illustrated in FIG. 5 are constituted by a linear set of sensors elements being provided with a filter having at least five, preferably ten, lines with chosen spectral response over a corresponding number of sensor element lines, the linear sensor sets preferably being are parallel. According to one embodiment the sensor sets define a two dimensional matrix also providing different measurements in the direction perpendicular to the path direction, e.g. for simultaneous spectral measurements in a case using a cylindrical lens this projecting a linear projection of a small area in the object.

According to another embodiment the sensor is rotated along an axis, the sensor sections having a distribution on the sensor having a radial component relative the rotation axis so as to scan the object image moving over the sensor.

The present invention also relates to a spectral imaging system comprising an image sensor unit as discussed above for imaging an area being moved in a direction and velocity relative to the system. The sensor unit is positioned in the system so as to have an orientation and position on said sensor unit relative to the direction of movement for making the object or area pass the same spectral responses at least twice.

The system further comprises imaging means, such as a lens, for projecting an image of the area on a sensor and sampling means for sampling the readout from each sensor element at a predetermined rate. The sampling rate is chosen chosen depending on the movement relative to the object so as to provide at least one sample from each line from each position in said area in the direction of movement. This way each position in said area is sampled in each spectral response at least twice, but from slightly different perspectives as the sensor unit is moved relative to the area or object. This way an efficient scan over the area may be obtained even when including three dimensional objects.

The sensor may comprise an imaging section for sampling a two dimensional representation of an image projected on said imaging section by said imaging means, and thus the movement is estimated by comparing successive images from said two dimensional representation and detecting the difference between them. This may be obtained using well known solutions, e.g. as described for fingerprint sensors in U.S. Pat. No. 6,289,114 as an alternative or supplement to the use of navigation systems such as GPS.

Image sensor and system may comprise to parts where the imaging part and filtering parts have slightly different degrees of focus so that the image pointes in the filtered part is point scattered to a size corresponding to the pixel size of the 2-D image. This may be obtained by providing optical path length differences between the filtered and imaging section. This is preferably done by providing different thicknesses of the glass plate holding the filters over the two sensor sections R2,R3.

The invention claimed is:

1. A spectral imaging system for imaging a scene or object, the spectral imaging system comprising:
   a spectral image sensor unit that receives a projected image of the scene or object
   with a field of view moving such that the image is projected along a path over the spectral image sensor unit resulting from the movement;
   the spectral image sensor unit comprising at least two sets of light sensor elements in a focal plane, each of the light sensor elements comprising a filter that adapts the spectral response of the light sensor element;
   wherein, within each set of the at least two sets of light sensor elements, there are light sensor elements with at least two types of different spectral responses;
   wherein each type of light sensor element is positioned in an elongated section having a width of at least one light sensor element, the spectral responses in the at least two sets of light sensor elements being essentially identical;
   wherein the elongated sections have an orientation and position on the spectral image sensor unit relative to a direction of movement so that at least part of the scene passes the same spectral responses at least twice;
   wherein a readout from each sensor line is sampled at a predetermined rate, the predetermined sampling rate being chosen relative to the movement so as to provide at least one sample from each line from each position in the scene in the direction of movement, each position in the scene being sampled in each spectral response at least twice; and
   wherein a plurality of readings of a position in the scene obtained with light sensor elements having essentially identical spectral responses and different viewing angles are averaged.

2. The spectral imaging system according to claim 1, wherein the sets of light sensor elements are linear on the spectral image sensor unit and arranged such that the movement causes at least part of the image of the scene or object to cross the linear sets as a result of the movement.

3. The spectral imaging system according to claim 1, wherein the movement is a rotation movement relative to an axis perpendicular to a sensor plane of the spectral image sensor unit, the sets of light sensor elements having a shape with a radial component relative to the axis.

4. The spectral imaging system according to claim 1, wherein the spectral image sensor unit comprises an imaging section for sampling a two dimensional representation of an image projected on the imaging section.

5. The spectral imaging system according to claim 4, wherein:
   the at least two sets of light sensor elements comprise a filtering section;
   an optical path length to the imaging section differs to a chosen degree from an optical path length from the object to the filtering section; and the optical path lengths are chosen so as to provide a sharp image of the scene or object on the imaging section and a defocussed representation on the filtering section.

6. The spectral imaging system according to claim 5, wherein the filter comprises a glass filter having different thickness over the imaging and filtering sections, thus providing different optical path lengths.

7. The spectral imaging system according to claim 1, wherein the movement is estimated by comparing successive readouts from the spectral image sensor unit.

8. The spectral imaging system according to claim 1, wherein angular or temporal characteristics of incoming light are estimated by comparing successive readouts from the spectral image sensor unit.

9. The spectral imaging system according to claim 7, where estimation of movement or scene properties is used to assess quality and integrity of spectral information obtained from different parts of an output image.

10. The spectral imaging system according to claim 1 in which the filter provides a continuous variation in spectral response across at least part of each filter set along a direction of the path.

11. The spectral imaging system according to claim 1 in which adaptation of spectral response of the light sensor elements is provided by movement of the filter relative to an array of light sensor elements.

12. The spectral imaging system according to claim 1, wherein the at least two sets of light sensor elements comprise a matrix of similarly shaped rectangular sets of light sensor elements covering a chosen part of the spectral image sensor unit.

* * * * *